United States Patent [19]
Ofer et al.

[11] Patent Number: 6,148,369
[45] Date of Patent: Nov. 14, 2000

[54] METHOD AND APPARATUS FOR PROVIDING LOGICAL DEVICES SPANNING SEVERAL PHYSICAL VOLUMES

[76] Inventors: Erez Ofer, 1530 Beacon St., Apt# 501, Brookline, Mass. 02146; John Fitzgerald, 3 Mayflower Dr., Mansfield, Mass. 02048; Kenneth Halligan, 118 Clubhouse Dr., Leominster, Mass. 01453

[21] Appl. No.: 08/941,439

[22] Filed: Sep. 30, 1997

[51] Int. Cl.$^7$ ........................................ G06F 12/02
[52] U.S. Cl. ..................... 711/114; 711/149; 711/117; 711/202; 711/153; 711/156; 711/173; 710/39; 710/130; 395/500
[58] Field of Search ........................... 711/5, 6, 112, 711/114, 153, 173, 202, 149, 117, 113, 4, 156, 166; 710/39, 130; 395/500

[56] References Cited

U.S. PATENT DOCUMENTS

| | | | |
|---|---|---|---|
| 5,457,791 | 10/1995 | Matsumoto et al. | 714/5 |
| 5,568,629 | 10/1996 | Gentry et al. | 711/114 |
| 5,671,439 | 9/1997 | Klein et al. | 710/1 |
| 5,687,390 | 11/1997 | McMillan, Jr. | 710/5 |
| 5,809,516 | 9/1998 | Ukai et al. | 711/114 |

*Primary Examiner*—Hiep T Nguyen
*Attorney, Agent, or Firm*—John M. Gunther; Krishnendu Gupta

[57] ABSTRACT

A method and apparatus for providing very large logical volumes (Meta Device) in a storage system is provided. The storage system includes host controllers and disk controllers which communicate through a shared memory. I/O requests are received by the host controller and placed into request queues. The request queues are associated with logical devices. A number of request queues in the host controller are concatenated together to produce the larger logical volume. The large logical volume appears to the host as a single addressable logical unit. I/O requests to the large logical volume are analyzed by the host controller to determine which logical devices are actually needed to service the request. The host controller then makes the appropriate queue entries. Processing of the requests then occurs in the same fashion as if the request had been to a non-Meta Device. This allows the disk controllers and memory to operate without modification.

4 Claims, 3 Drawing Sheets

METHOD AND APPARATUS FOR PROVIDING LOGICAL DEVICES SPANNING SEVERAL PHYSICAL VOLUMES

BACKGROUND OF THE INVENTION

This invention relates generally to storage systems associated with computer systems and more particularly to providing a method and apparatus for providing logical volumes which include more than one physical storage device.

As it is known in the art, computer systems generally include a central processing unit, a memory subsystem and a storage subsystem. According to a networked or enterprise model of a computer system, the storage subsystem associated with or in addition to a local computer system, may include a large number of independent storage devices or disks housed in a single enclosure. This array of storage devices is typically connected to several computers (or hosts) via dedicated cabling or via a network. Such a model allows for the centralization of data which is to be shared among many users and also allows a single point of maintenance for the storage functions associated with the many computer systems.

One type of storage system known in the art is one which includes a number of disk storage devices configured as an array (sometimes referred to as RAID). Such a system may include several arrays of storage devices. In addition to the arrays of storage devices, typical storage systems include several types of controllers, such as host controllers and disk controllers, for controlling the various aspects of the data transfers associated with the storage system.

The disk devices of a storage system are typically configured to represent one or more so called logical device. A logical device is a way to define a contiguous area of storage space as being available as a distinct addressable unit. The addresses used to access data in a logical device typically need to be translated into physical addresses in order to find the requested data. In many systems, a logical device includes all the addressable storage of a single physical volume (e.g. disk drive). Thus, state of the art storage systems may include logical devices that provide 9 GB of storage (from a single disk drive).

Several operating systems (e.g. Microsoft® Windows N/T) require that the data storage systems support logical device sizes which exceed current physical volume sizes. One approach to providing larger logical devices would be to increase the size of the associated physical volumes. This would be accomplished by, for example, replacing a 9 GB disk drive with a 23 GB disk drive. This approach suffers from several drawbacks including the increased expense associated with larger capacity drives and the need to retrofit installed systems with these drives in order to provide the larger logical devices. Additionally, in storage systems like the SYMMETRIX® storage system manufactured by EMC Corporation of Hopkinton, Mass., using a larger physical volumes requires increasing the size of each associated device header in global memory. This requirement arises from the fact that there would then be more tracks associated with each logical device. It would be advantageous therefore to provide a means of using two or more physical volumes to define a single large logical device. It would be of further advantage that the arrangement of the new large logical device be transparent to a disk controller controlling the physical volumes associated with the large logical device.

SUMMARY OF THE INVENTION

In accordance with one aspect of the present invention a storage system is provide which includes a plurality of storage devices. The storage devices may be disk drives, tape drives, optical drives, or the like. In addition to the storage devices, the storage system also includes a corresponding plurality of devices queues which are used generally to store incoming requests until they can be serviced. A subset of the storage devices, and a corresponding subset of device queues are grouped together to form a so called META DEVICE. Although the META DEVICE may include several separate storage devices, it presents a single addressable unit to a host computer. The storage system further includes a host controller. The host controller receives input/output (I/O) data requests from the host computer. Upon receipt of a data request, the host controller determines if the request is to a META DEVICE. If the request is to a META DEVICE, the host controller then determines which device within the subset of devices should actually receive and execute the command. The data request is then placed in the appropriate device queue and serviced as like any other request (i.e. like a request to a non-META DEVICE). With such an arrangement, a storage system may provide a logical device which provides a storage capacity which is much larger than any single physical storage device in the system. At the same time, the storage devices, shared memory, and storage controllers have no knowledge of the META DEVICE and require no modification in their operations in order to service a request to a META DEVICE.

In accordance with another aspect of the present invention, a method of operating a data storage system which includes a host controller, a storage controller, a shared memory, and a plurality of storage devices and a corresponding plurality of device records associated with said storage devices, wherein said device records function to queue incoming commands from a host computer includes the steps of first establishing a subset of said plurality of storage devices to function as a single addressable storage device (META DEVICE) as seen by said host computer. Once established, header portions of the device records making up the META DEVICE are modified to indicate membership in the META DEVICE. Thereafter, the host controller receives input/output (I/O) command directed to the META DEVICE. In response to receipt of an I/O command to the META DEVICE, the host controller stores the I/O command in a device record corresponding to the first device of the META DEVICE. The host controller analyzes the I/O command to determine which one of one of the subset of storage devices should perform the I/O command. Once determined, the host controller copies information relevant to the I/O command to the device record associated to storage device which was determined to be the target of the I/O. Thereafter, the command is executed in a known manner. With such a method, a storage system may provide a logical device which provides a storage capacity which is much larger than any single physical storage device in the system. At the same time, the storage devices, shared memory, and storage controllers have no knowledge of the META DEVICE and require no modification in their operations in order to service a request to a META DEVICE.

BRIEF DESCRIPTION OF THE DRAWINGS

The above and further advantages of the present invention may be better understood by referring to the following description taken into conjunction with the accompanying drawings in which.

DETAILED DESCRIPTION OF THE PREFERRED EMBODIMENT

Figure 1:
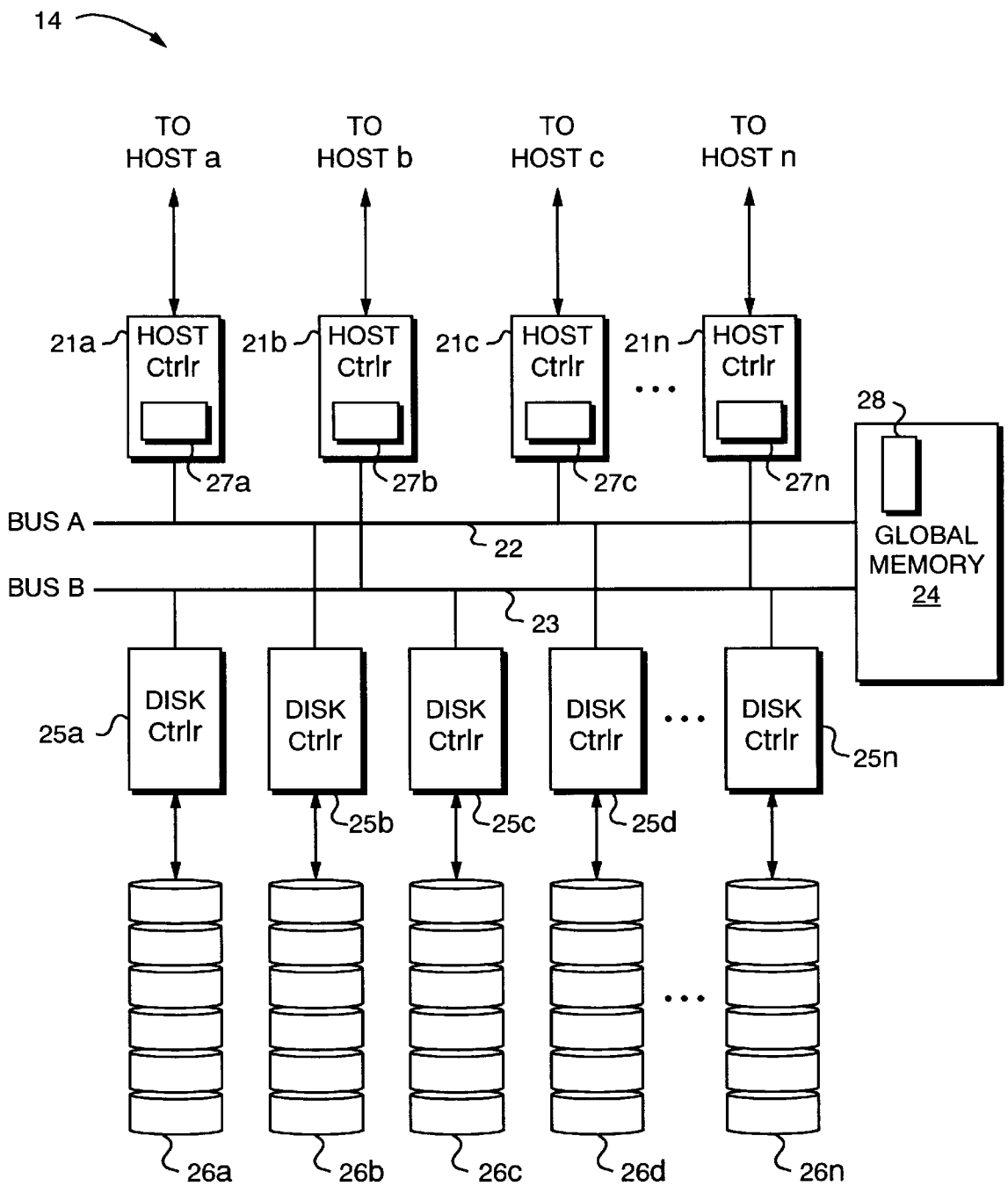
FIG. 1 is a diagrammatic representation of a storage system incorporating the present invention.

Referring first to FIG. 1 storage system 14 is shown to include a plurality of host controllers 21a–21n which are, according to a preferred embodiment of the present invention, coupled alternately to buses 22 and 23. Each host controller 21a–21n is responsible for managing the communication between its associated attached host computers and storage system 14. The host controllers of the preferred embodiment may include on or more central processing units (CPUs). The controller CPUs operate under program control to manage the flow of data between an associated host computer and the storage system 14. In addition, each host controller 21a–21n may also include internal queues 27a–27n respectively. As will be described in more detail below, the internal queues are used to store incoming requests from an attached host computer until the request can be serviced by the storage system.

Also coupled alternately to buses 22 and 23 are a plurality of disk controllers 25a–25n. Controllers 25a–25n are here similar in construction to controllers 21a–21n. That is, each includes at least one CPU configured to operate under control of a program loaded into an associate CPU program memory. Coupled to each disk controller is an array of storage devices which as shown here may be magnetic disk devices. Like the host controllers described above, each disk controller is responsible for managing the communications between its associated array of disk drives and the host controllers or memory 24 of storage system 14.

As mentioned above, traditionally, a logical device is configured as a portion or all of a storage device so that a host computer may address the device using a convenient addressing scheme. According to the present invention, and as will be discussed in detail below, several of the physical volumes of arrays 26a–26n are concatenated together to produce a single large logical device or a so-called "meta device". One feature of the present invention is that disk controllers do not require any knowledge of the structure of the meta-device. That is, the disk controllers behave exactly as they have in the past when logical devices were confined to a single physical volume. To accomplish this, the host controllers of storage system 14 are enhanced to receive, decode, and distribute commands, address, and data associated with the new meta devices.

Figure 2A:
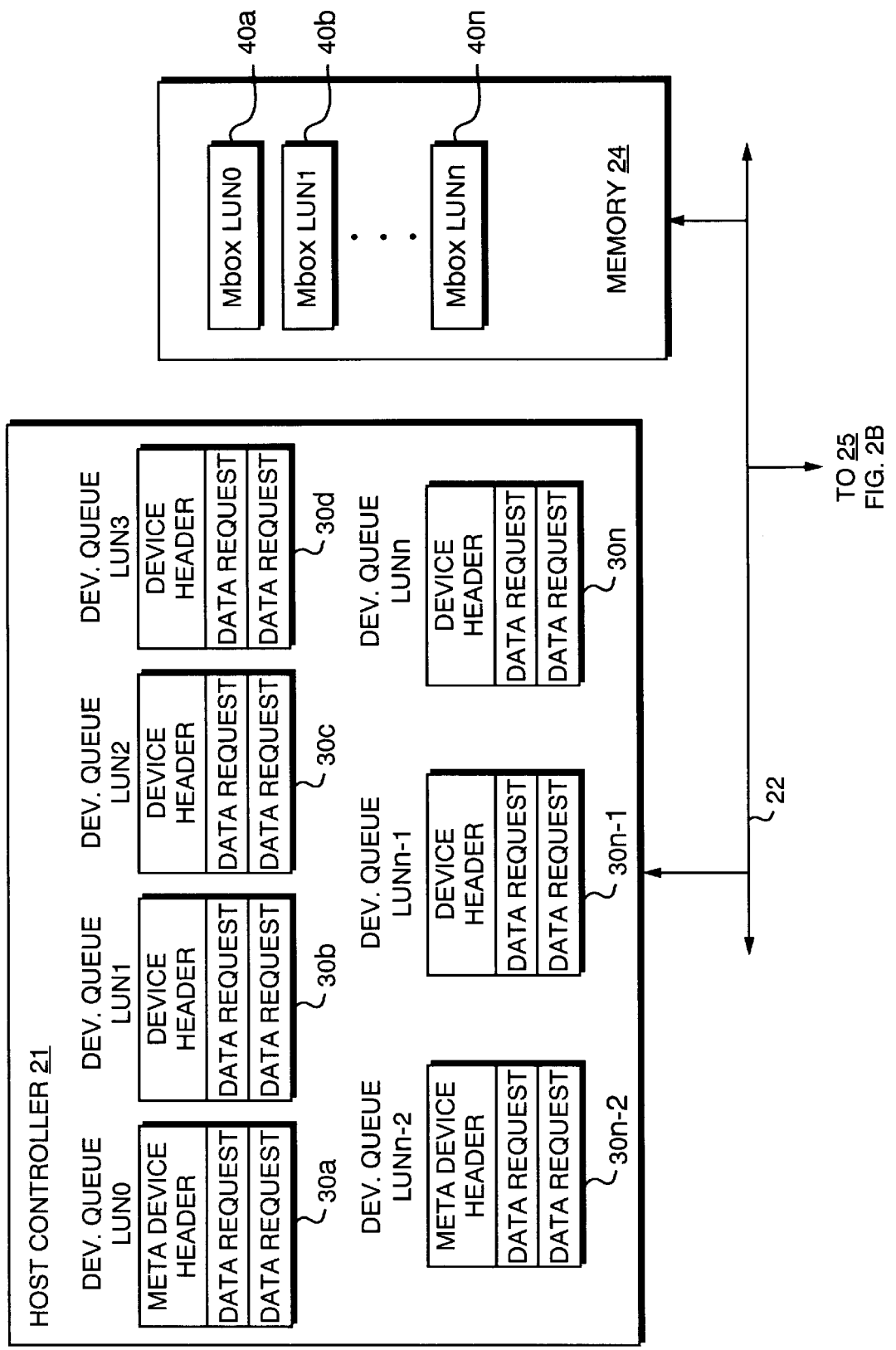
FIG. 2 is a block diagram of a portion of the data storage system of FIG. 1.
Figure 2B:
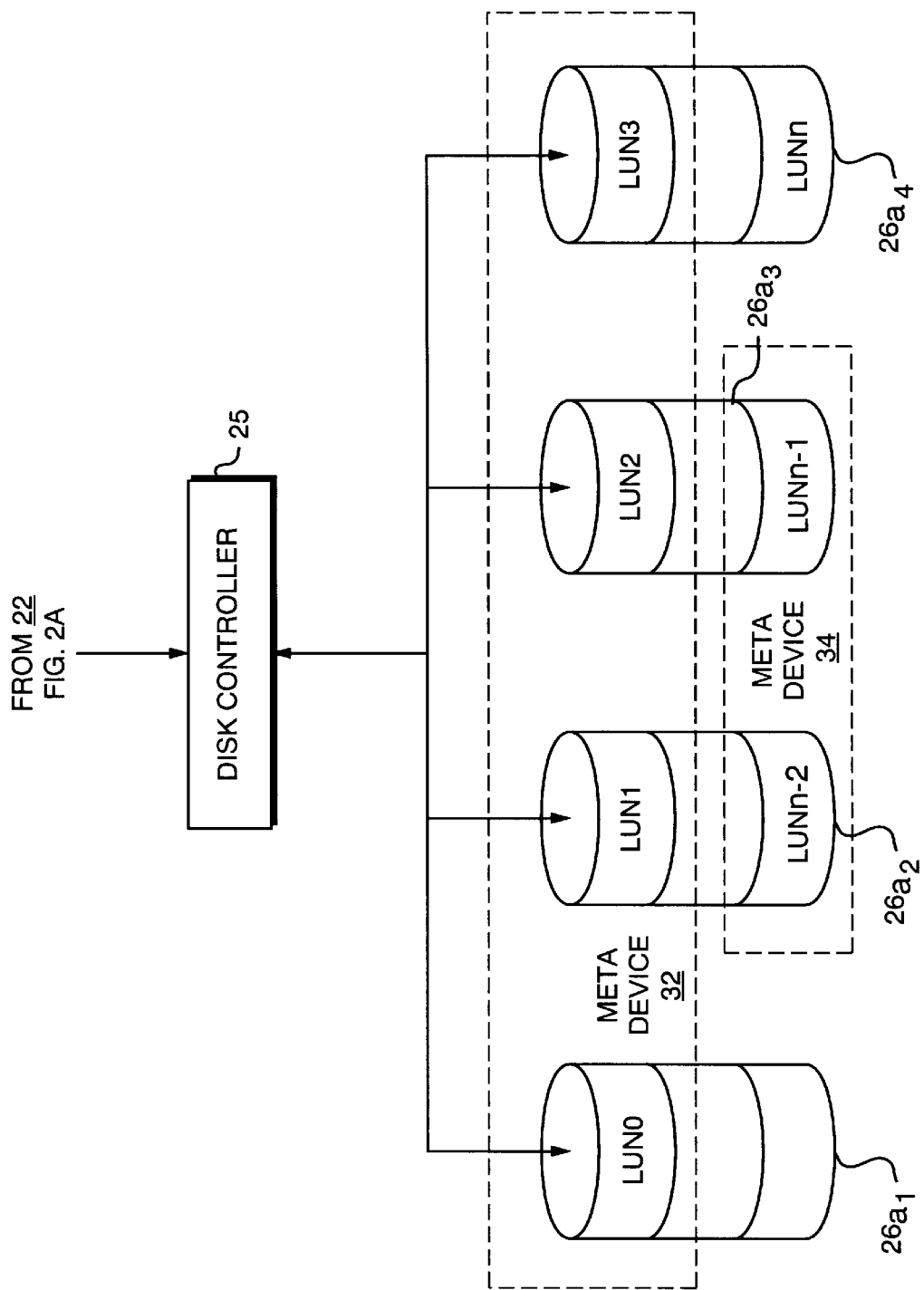

In addition to the controllers described above, storage system 14 also includes a global memory 24 coupled to both buses 22 and 23. According to a preferred embodiment of the present invention, a portion of global memory 24 serves as a very large cache. The cache is used as a staging area during the transfer of data between the host computers and the storage devices of disk arrays 26a–26n. In addition, the global memory includes a number of single entry queues or mailboxes. Each logical device of storage system 14 has an associated mailbox in memory 24. The mailboxes are means by which the host controller communicates with the associated logical devices and the devices which make up the meta devices. That is, in order for a host controller to send a request for data to a particular device, the host controller will arbitrate for access to one of the busses 22, 23 in order to communicate with memory 24. Once access is granted, the host controller will attempt to set a lock on the target mailboxes associated with the meta device. Once locked, the host controller places its request in the mailboxes. As shown in FIG. 2, host controller 21 includes a plurality of device records 30a through 30n. The actual number of device records corresponds to the number of logical devices which may be accessed by host controller 21. In the preferred embodiment the logical devices are created during a configuration procedure wherein the logical devices available to each host controller are established and assigned. With this information, the host controller creates a device queue for each logical device for which it is has access. Each device record is used to store data requests received from the host computer which are directed to a particular logical device. In accordance with the present invention and as will be discussed in more detail below, two or more device records will be linked to form a single large device from the perspective of the host computer attached to storage system 14.

Generally, when host controller 21 receives a data request from the host computer it identifies which logical device is the target of the data request by examining the address sent by the host. The request is then placed in the appropriate request queue. For example, a data request to logical device zero may be stored in device record 30a.

As described earlier memory 24 includes a plurality of mailboxes 40a through 40n where each mailbox is associated with a particular logical device. Thus the total number of mailboxes in memory 24 corresponds to the total number of logical devices in storage system 14. Each request for read or write of data to a particular logical device requires that the request be placed in the appropriate mailbox corresponding to that logical device. According to the preferred embodiment, each mailbox 40a–40n is only capable of storing a single data request at any given time. It should be noted however that multiple entry mailboxes may be employed to queue several data request to each logical device of storage system 14.

As mentioned above, the present invention provides a meta device which includes two or more logical devices. Although each logical device of storage system 14 would normally provide a separate addressable unit, when the same devices are grouped as a meta device, the host addresses the device as though it were a single device. As will be described below, management of the associated device queues is performed by the host controller 21. The disk controller and memory 24 operate as if the logical devices which make up the meta device were separate entities.

Before discussing the particulars of the operation of storage system 14 with respect to the meta devices of the present invention, a general overview of the operation of storage system 14 with respect to transactions involving the meta devices will first be discussed. As previously mentioned, the host controller maintains individual device records for each of the logical devices that comprise the meta device. The first device of the meta device, herein called the meta head, receives the incoming request from the host computer. The information stored in the meta head device record is used to perform any initial processing of the command and is also used to facilitate the queuing of any additional commands which may be required.

Once initial processing of an incoming command (i.e. data request) is complete using the device record of the meta head, host controller 21 makes a calculation to determine which of the logical devices of the meta device should actually be the target of the data request. If a logical device other than the logical device associated with the meta head is the target of the data requests, a so-called context switch may occur in which all of the vital parameters regarding the data request are transferred to the device record of the appropriate logical device. Execution then proceeds with an internal device record pointer pointing to the device record of the actual logical device within the meta device which is required to execute the data request. If in fact the meta device head is the device which is going to execute the data request, then no context switching is required.

If the data request received by host controller 21 is a request for a portion of data which actually spans two individual logical devices, the first portion of the data request will be performed with respect to the first logical device and then once the end of that logical device has been reached a context switch is performed and the remaining data of the data request is processed by the next logical device in the meta device.

Still referring to FIG. 2, host controller 21 is shown to include a plurality of device queues 30a through 30n. To illustrate the configuration of the device queues of host controller 21 as being configured to provide at least one meta device, device queues 30a through 30d are here grouped together to form a single meta device. The meta device which is serviced by device queues 30a through 30d is shown as meta device 32 which includes logical unit zero, logical unit one, logical unit two, and logical unit three of disks $26a_1$ through $26a_4$ respectively.

As shown, device queue 30a has in the header portion of the device queue a meta device specific header area. The meta device header area as well as the other headers of device records which make up the meta device include several parameters which are not included in a typical device header (i.e. a non-meta device record). Here, the parameters include a meta_block_number parameter which is used to maintain the block number corresponding to a particular I/O (i.e. data request). As the I/O operation progresses, the meta_blk_number parameter is incremented in order to keep track of the current block number of the meta device (which may be different than the actual logical device block number). This parameter is updated in both the meta head device record and the device record of the currently executing device record. Another meta device specific parameter is the meta_blk_cntr parameter which is used to maintain a decreasing count of the number of blocks remaining in the current I/O. Like the meta_blk_number, the meta_blk_cntr is maintained with regard to the meta device blocks and not the individual logical device blocks. The meta_blk_cntr is also maintained in both the meta head and the currently executing logical device.

Other parameters and flags in the device headers are used to identify which devices belong to the meta device and to identify which devices are the meta head and meta tail (last device in the meta device). So for example, device record 30a would be the meta head for meta device 32 and device record 30d would be the meta tail. Device records 30b and 30c would be meta device members. Another flag maintained in the meta device record headers is a meta_dev_oper_flag which is used for, among other things, to indicate that a context switch has taken place. Other pointers and parameters are used to identify the meta head to each meta device member, indicate the size of the meta device, and identify the position of a particular device within the meta device. Still other flags are used to keep track of the current active meta device member and indicate the storage system specific identifier associated with the meta device member. It will be appreciated by those of skill in the art the above parameter may be used in combination with a program running on a CPU of controller 21 to manage the meta device such that transactions with the memory 24 and disk controller 25 are unaffected.

A second meta device 34 is configured from the disks $26a_2$ and $26a_3$ and includes logical unit n-1 and logical unit n-2. The device records used in communicating with meta device 34 are shown as being device queue 30n-2 and 30n-1. Here the meta head would be device record 30n-2 and the meta tail would be device record 30n-1. The parameters described above for meta device 32 would also be maintained for meta device 34.

To illustrate I/O transactions with meta device 32, certain assumptions will be made for ease of explanation. It should be understood that the values assigned to the individual devices are for illustration purposes only and should not be seen as a limitation of the present invention. The first assumption will be that each of the logical units zero through three of meta device 32 will each include 1,000 cylinders. These 1,000 cylinders include 960,000 blocks each where each block further includes 512 bytes of storage. This would indicate that each of the logical devices zero through three has storage equal to 468 megabytes. The combined meta device, therefore, will have 4,000 cylinders representing 3,840,000 blocks and present a total storage area of 1.875 gigabytes. In practice each of the individual logical devices would include several gigabytes of storage with the actual final meta device having a storage area in the tens of gigabytes or even larger. Thus, the previous stated numbers are used for example only and for ease of explanation.

To describe the generalized operation of an I/O with respect to a meta device, three different read operations will be considered. The first read operation is for 8 blocks beginning at block 4,000. Since the 8 blocks would all reside within the first device (LUN0) of the meta device, the I/O request would be serviced by the meta device head alone. That is, the request would be placed in queue 30a. Sometime thereafter the request would be placed by host controller 21 into mailbox 40a of memory 24. In accordance with normal storage system operations, sometime thereafter, the request will be serviced by disk controller 25 with the data finally being retrieved from LUN0 of meta device 32 and placed in the cache portion of memory 24.

The second example includes a read of 8 blocks beginning at block number one million. The starting address of this I/O is larger than the total volume area of the first device of meta device 32 and falls within the range of blocks in the second meta device member (LUN1). Thus when the command is received it will be placed in queue 30a as a data request. When it comes time for host controller to service the data request the request would be read from queue 30a and processed to determine which of the actual device queues is appropriate for the request. The determination may be made using one or more software routines executing on the CPU of controller 21. Here the appropriate device would be LUN1 and therefore the request will cause a context switch in which all of the information relating to this I/O request will be copied into device queue 30B. The appropriate parameters described above of the header portion of device record 30b will also be updated. Sometime thereafter, host controller 21 will place the request in mailbox 40b of memory 24 and, as above, sometime thereafter disk controller 25 will service that request by delivering the data from LUN1 one of meta device 32 to the cache portion of memory 24.

The third example includes a read of 23 blocks beginning from block 959,990. It can be seen that this I/O request actually spans two members of the meta device with the I/O starting first with logical unit zero of meta device 32 and ending in logical unit one of meta device 32. As in the previous example, when the request is received is first placed in the meta device head device queue (i.e., device queue 30a) and processing of the I/O request begins. The request will first be processed as described above with the example in which the I/O request was fully contained within the meta device head. Once the end of the first logical unit is reached, a context switch is performed with all of the relevant information copied to device record 30b and processing of the I/O request continues using device record 30b along with mailbox 40b and logical unit one. It can be seen by the previous examples that a single large logical device may be presented to the host computer while transactions with the memory 24 disk controller 25 and individual storage devices 26$a_1$ through 26$a_4$ may occur as if there were no meta device to find. It will be apparent to those with skill in the art that the method of providing meta devices as described above allows field retrofits of current existing storage systems without the need to replace or redesign hardware in order to achieve the large logical volumes required by certain operating systems.

Having described a preferred embodiment of the present invention, it will now become apparent to those of skill in the art that other embodiments incorporating its concepts may be provided. It is felt therefore that this invention should not be limited to the disclosed embodiment but rather should be limited only by the spirit and scope of the appended claims.

What is claimed is:

1. In a storage system including a host controller, a storage controller, a shared memory, and a plurality of storage devices and a corresponding plurality of device records associated with said storage devices, wherein said device records function to queue incoming commands from a host computer, a method of operating said storage system comprising the steps of:

establishing a subset of said plurality of storage devices to function as a single addressable storage device (META DEVICE) as seen by said host computer;

modifying header portions of associated ones of said device records to indicate that said associated ones of said storage devices are members of the META DEVICE;

receiving by said host controller, an input/output (I/O) command directed to said META DEVICE;

storing said I/O command in a device record corresponding to a first device in said META DEVICE;

analyzing said I/O command to determine which one of said subset of storage devices should perform said I/O command and copying said I/O command to a corresponding one of said device records; and executing said I/O command, wherein said executing step further includes the steps of:

placing an entry in a mailbox associated with said one of said subset of storage devices, said mailbox residing in said shared memory;

retrieving, by said storage controller, said entry in said mailbox; and performing a data transfer with said one of said subset of storage devices.

2. The method of claim 1 wherein modifying step further includes the steps of adding information in a first device record of said META DEVICE to identify said first device record and an associated storage device as a META HEAD, adding information in a last device record of said META DEVICE to identify said last device record and an associated storage device as a META TAIL.

3. A storage system comprising:

a plurality of storage devices;

a plurality of device queues corresponding to said plurality of storage devices, a subset of said plurality of storage devices being grouped together to present a single addressable unit (META DEVICE) to a host computer performing input/output transactions with said storage system;

a host controller configured to receive data requests from said host computer and determine whether the data requests are targeted to a single one of said storage devices or to said META DEVICE, and to store said data request in the device queue corresponding to a first storage device in said META DEVICE and to make an entry in an appropriate one of said subset of said plurality of storage devices if said request is targeted to said META DEVICE;

a shared memory, the shared memory having a plurality of mailboxes corresponding to said plurality of storage devices, each one of said plurality of mailboxes configured to store an entry if the data request from the host computer is targeted to its corresponding storage device; and a storage controller configured to retrieve the entry in said mailbox and perform a data transfer.

4. The storage system of claim 3 wherein the device queues corresponding to the subset of the plurality of storage devices are further configured to store information to indicate that the subset of storage devices are members of the META DEVICE, store information in a first device queue of said META DEVICE to identify said first device queue and an associated storage device as a META HEAD, and store information in a last device queue of said META DEVICE to identify said last device queue and an associated storage device as a META TAIL.

* * * * *

UNITED STATES PATENT AND TRADEMARK OFFICE
CERTIFICATE OF CORRECTION

PATENT NO. : 6,148,369
DATED : Nov. 14, 2000
INVENTOR(S) : Ofer et al

It is certified that error appears in the above-identified patent and that said Letters Patent is hereby corrected as shown below:

On title page, item [73] should read:

Assignee: EMC Corporation, Hopkinton, MA

Signed and Sealed this

Twenty-ninth Day of May, 2001

Attest:

NICHOLAS P. GODICI

Attesting Officer   Acting Director of the United States Patent and Trademark Office